United States Patent [19]

Resler, Jr.

[11] 4,135,481
[45] Jan. 23, 1979

[54] EXHAUST GAS RECIRCULATION PRE-STRATIFIED CHARGE

[75] Inventor: Edwin L. Resler, Jr., Ithaca, N.Y.

[73] Assignee: Cornell Research Foundation, Inc., Ithaca, N.Y.

[21] Appl. No.: 745,213

[22] Filed: Nov. 26, 1976

[51] Int. Cl.² .......................................... F02M 25/06
[52] U.S. Cl. .............................................. 123/119 A
[58] Field of Search ....................... 123/119 A, 119 D

[56] References Cited

U.S. PATENT DOCUMENTS

| 1,955,661 | 4/1934 | Waldo | 123/119 D |
| 2,652,040 | 9/1953 | Trih | 123/119 A |
| 3,024,776 | 3/1962 | Shiruin | 123/119 D |
| 3,444,846 | 5/1964 | Sarto et al. | 123/119 A |
| 3,498,274 | 3/1970 | Chapman | 123/119 A |
| 3,507,260 | 4/1970 | Walker | 123/119 A |
| 3,587,541 | 6/1971 | Sarto | 123/119 A |
| 3,633,553 | 1/1972 | Holzapfel | 123/119 A |
| 3,810,454 | 5/1974 | Hunt | 123/119 D |
| 3,851,632 | 12/1974 | Teshirogi et al. | 123/119 A |

Primary Examiner—Ronald H. Lazarus
Assistant Examiner—David D. Reynolds
Attorney, Agent, or Firm—Lawrence E. Laubscher; Ralph R. Barnard; Theodore C. Wood

[57] ABSTRACT

A low pollution internal combustion engine is disclosed in which a predetermined portion of a stratified charge is initially pre-formed in the part of the manifold which supplies the predetermined charge portion to the cylinder, said predetermined charge portion being composed of fuel-air mixture diluted by exhaust gas and pre-formed when the intake valve for the cylinder is in the closed condition, and subsequently being introduced together with the remaining portion of the stratified charge, when the intake valve is opened during the intake stroke of the engine.

3 Claims, 1 Drawing Figure

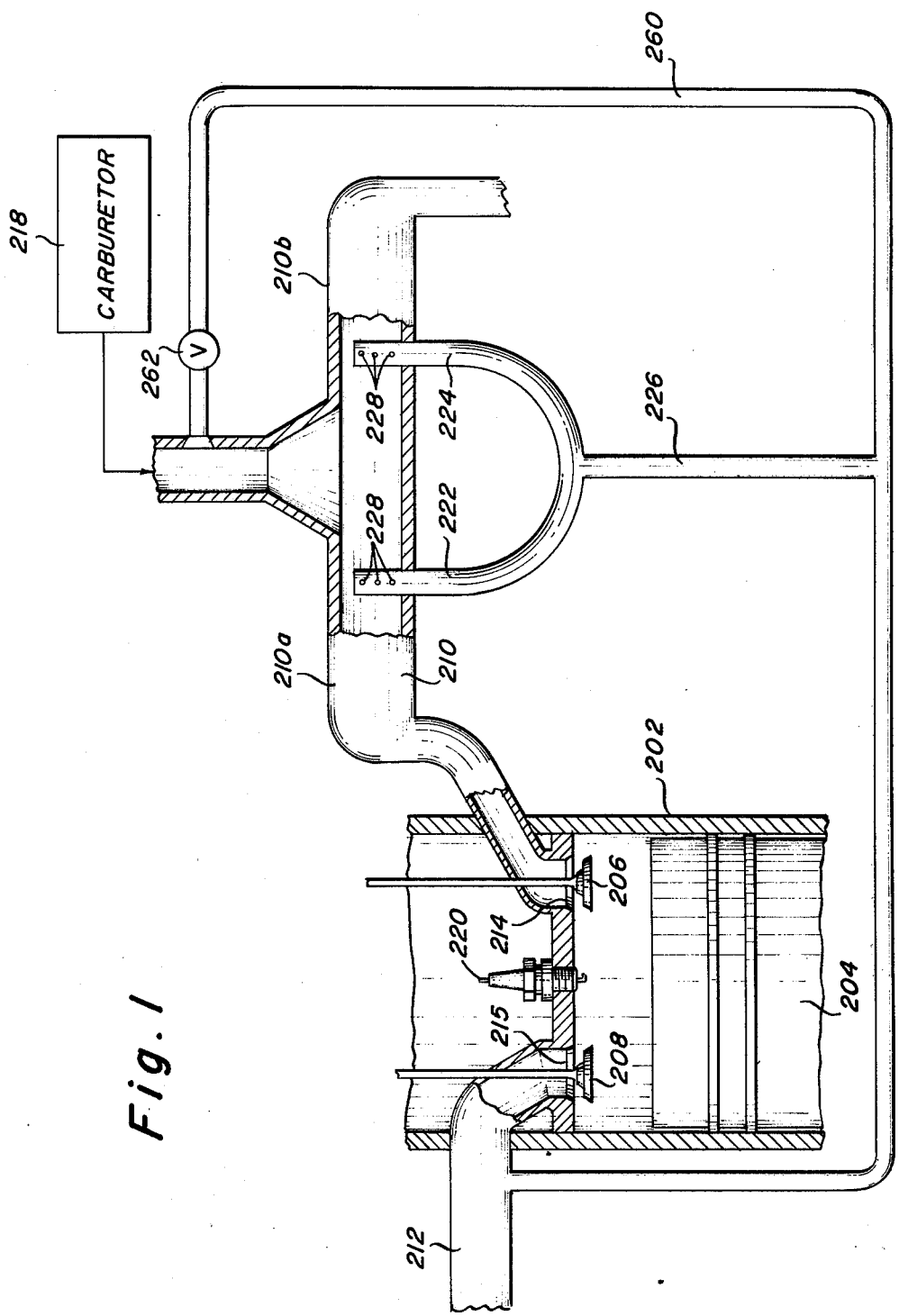

EXHAUST GAS RECIRCULATION PRE-STRATIFIED CHARGE

BACKGROUND OF THE INVENTION $NO_x$ can be controlled by minimizing its formation and/or causing it to chemically react with chemicals to produce less objectionable compounds and elements. The formation of $NO_x$ is primarily determined by oxygen availability, peak temperature and residence time at high temperatures.

With a homogeneous charge of air/fuel one can minimize formation of $NO_x$ by causing combustion under oxygen starved conditions, but under those conditions objectionable amounts of CO and HC are produced and so steps should be taken to minimize those compounds in an efficient manner (see U.S. Pat. No. 3,877,229 issued to the instant inventor).

With a homogeneous charge at or near stoichimetric, little can be done with peak temperature and residence time at high temperature as a means to minimize formation of $NO_x$ so one is forced to cause the $NO_x$ to be reacted with other chemicals for minimizing the objectionable compound. One manner for producing such $NO_x$ reaction is the well known catalytic exhaust, reactor and another manner for causing $NO_x$ reaction is by mixing the $NO_x$ with HC under proper temperature and oxygen starved conditions as described in copending application Ser. No. 449,391 filed Mar. 8, 1974 by the instant inventor. When employing a homogeneous charge of air/fuel at or near stoichimetric, regardless of which manner of $NO_x$ reaction is employed, one must take additional steps to minimize HC and CO as exhaust pollutants.

Although significant results in the reduction of $NO_x$, HC and CO exhaust pollutants have been achieved in engines having homogeneous charge of air/fuel at or near stoichimetric, it appears that the goals for pollution control will be extremely difficult, if not impossible, to achieve. Therefore, substantial interest has been recently shown in the use of stratified charge as a means for pollution control.

Many approaches which have been taken for creating stratified charge have been referred to as "prechamber stratified charge engines". A recent review of many of the approaches will be found in the publication entitled "Evaluation of Prechamber Spark Ignition Engine Concepts" by the Office of Research and Development, U.S. Environmental Protection Agency, Washington, D.C., dated February 1975 (EPA - 650/2/75-D23). Another group of prior approaches for creating stratified charge employs introducing a relatively fuel-lean air/fuel mixture by way of the conventional carburetor-manifold as the main cylinder charge and introducing fuel or a relatively fuel-rich air/fuel mixture in such a manner as to create a readily ignitable layer at or near the spark plug. Examples of such systems are presented in U.S. Pat. Nos. 3,504,681 to H. Winkler; 2,121,921 to M. Mallory; 2,242,990 to T. E. Brown; 3,238,930 to E. A. VonSeggern et al.; 3,270,721 to L. Hideg, et al.; 3,315,650 to I. N. Bishop et al.; and 3,318,292 to L. Hideg. Still another group of prior approaches for creating stratified charge employs the conventional carburetor system to introduce a stoichiometric air/fuel mixture to the combustion chamber and employs a source of air or relatively fuel-lean air/fuel mixture which is positioned in the area immediately above the piston in the combustion chamber. Examples of such systems are U.S. Pat. Nos. 3,170,445 to Folche; 3,364,911 to Baudry et al.; and 1,505,697 to Campbell.

Since all of the above noted approaches involve the creation of the stratified charge within the combustion chamber rather than pre-forming some or all of the charge prior to delivery to the combustion chamber, they involve complex controls and require design and manufacturing changes to the engine which are costly.

In accordance with the invention disclosed in my copending patent application Ser. No. 610,420, filed Sept. 4, 1975, the need for complex controls and changes to the engine are avoided since the intake manifold is provided with a source of air which is so positioned and proportioned that while the intake valve of the cylinder is closed, air is introduced into the manifold in such a manner as to create within the manifold a pocket of relatively fuel-lean fuel/air mixture.

It should be noted that in prior approaches to stratified charge, the charge is relatively fuel rich or stoichiometric in the vicinity of the spark plug and relatively fuel lean in the vicinity of the piston. With such a form of stratified charge, one can adjust the air/fuel mixture and total quantity of each of the two parts of the charge to minimize the formation of $NO_x$ and CO, however when such is done, there is a probability that the exhuast will contain excess amount of HC under such operating conditions as idle, deceleration, acceleration, and/or cold start.

To control $NO_x$ pollution in the exhaust of internal combustion engines, it has become common practice to incorporate what is known as exhaust gas re-circulation (EGR). In such systems, a portion of the exhaust gases from the exhaust manifold are passed through a control valve and combine with the carburated fuel/air mixture at a point immediately below the throttle plate and the control valve responds to intake manifold pressure. In such a system the carburated fuel/air mixture is uniformly diluted with exhaust gas and the amount of uniform dilution of a given cylinder charge varies with the intake manifold pressure. Examples of such an EGR system are disclosed in U.S. Pat. Nos. 3,625,189 to Myers, 3,809,039 to Alquist, 3,908,618 to Tange, et al. and 3,941,105 to Yagi, et al.

SUMMARY OF THE INVENTION

In accordance with the principles of this invention the charge in a combustion chamber of an internal combustion engine is stratified such that one or more layers of the charge is/are diluted with exhaust gas.

An object of the invention is to provide a simple but effective means to produce a stratified charge for an internal combustion engine in which at least one layer of the charge is diluted with exhaust gas.

Another object of the invention is to provide an internal combustion engine with a manifold having an exhaust intake which creates a pocket of exhaust diluted fuel/air mixture between the cylinder intake valve and the carburetor and thereby pre-form all or a portion of a stratified charge.

Still another object of the present invention is to provide an improved internal combustion engine including means for forming in portions of the intake manifold adjacent each intake valve which is in a closed condition a predetermined quantity of pre-stratified exhaust gas diluted fuel mixture the volume of which is less than the displacement of the cylinder. Consequently, when the intake valve is subsequently opened, the quantity of exhaust gas diluted mixture partially fills the cylinder during the suction stroke to define a layer of diluted mixture at a position between the piston and spark plug. The remaining portion of the cylinder adjacent the spark plug or spark plug and piston being filled with a more concentrated layer of the carbureted fuel-/air mixture.

In one embodiment of the invention, the means for forming the quantity of diluted mixture in the intake manifold comprises a conduit which is in communication at one end with exhaust gas and which terminates at its other end within the intake manifold and which is operable so that a substantial portion of the associated intake manifold is filled with exhaust gas diluted fuel/air mixture while the intake valve is closed.

Other objects and advantages of the invention will become apparent from a study of the following specification when viewed in the light of the accompanying drawing, the single FIGURE of which is a partly diagrammatic detailed sectional view of the invention wherein the exhaust gas conduit terminates in the intake manifold.

DESCRIPTION OF THE PREFERRED EMBODIMENT

As is known in the art, the operation of an internal combustion engine in the stratified charge mode effects a material reduction in the oxides of nitrogen, unburned hydrocarbons, and carbon monoxide pollutants in the exhaust gases. An internal combustion engine operating on the Otto Cycle has an efficiency which depends only on the compression ratio (r)

$$(\eta = 1 - \frac{1}{\gamma^{\gamma-1}})$$

$\gamma$ equals the ratio of the specific heats $c_p/c_v$. The work, W. per pound of charge cycled is the efficiency times the heat added, Q. For a given RPM (road speed), the amount of charge passing though the engine M. is proportional to the manifold pressure, MP. To compare the standard with the stratified cycle, equate the powers P. Since the efficiencies are equal, the heat added must be the same. Since only part of the charge in the stratified engine has fuel and the carburetor provides the same air/fuel ration to the part of the charge with fuel, the manifold pressure is higher in the stratified charge case. Since for stratification, the manifold pressure, MP, increases, the heat added per pound of charge is less and the maximum temperature is also less since it is proportional to the heat added per pound of charge. This reduction in temperature is extremely effective in reducing nitric oxides. For example, an increase of manifold pressure by 30% can reduce the maximum temperature by 1000° K. and nitric oxide concentration by a factor greater than 10.

This large reduction in NO concentration is due to two effects, (1) the lower temperature implying a lower equilibrium value and probably more importantly, (2) a large increase in formation time. The effects of time on NO formation has recently been reported by Komiyama and Heywood, SAE, May 1973, 730475. The total amount of exhaust gases added in stratified form exceeds that which can be added by conventional uniform dilution techniques and still have the engine perform satisfactorily.

Since stratification reduces the pumping losses of the engine, this can produce a significant fuel saving at low speeds, for example, below 30 mph.

Referring now to the drawing, the internal combustion engine includes a plurality of cylinders 202 (only one of which has been illustrated) in which is reciprocably mounted a piston 204. Associated with each cylinder are conventional intake and exhaust valves 206 and 208, respectively, and intake and exhaust manifolds 210 and 212 which communicate at one end with intake and exhaust ports 214 and 215, respectively. The intake manifold is connected with a carburetor 218 for supplying the fuel/air mixture to the cylinder. Connected with the cylinder is a spark plug 220 for igniting the fuel/air mixture that is supplied to the cylinder via intake valve 206.

In accordance with a characterizing feature of the present invention stratifying devices 222, 224 (referred to as screws for convenience) located in the intake manifold 210 between the carburetor 218 and the intake valve 206 cause a curtain of diluted exhaust gas to be created in the mid portion of the manifold.

The stratifying devices 222, 224 each have a plurality of holes 228 which permit exhaust gas at 226 to pass through the holes to form a curtain of diluted exhaust gas in the interior of intake manifold 210. The number and size of holes 228 and their location relative to the passage within the intatke manifold is quite critical to the practice of this invention. The holes should be positioned relative to the passage of fuel/air mixture from carburetor 218 through manifold 210 such that the exhaust gas from those holes will create a pocket or curtain of diluted exhaust gas in the mid portion of the manifold between the intake valve 206 and the carburetor 218. The holes are positioned so that exhaust gas passes through the holes in a direction transverse to the main passage of fuel/air mixture through the manifold. The number and size of holes must be sufficient for the volume of exhaust gas entering at 226 to pass to the interior of the manifold and not in such a manner as to produce dilution of all of the fuel/air mixture in the manifold.

The size of the passage opening at 226 determines the volume of the pocket of diluted exhaust gas created in the mid portion of the manifold and the particular size for a given engine to attain desired pollution control under given operating conditions depends upon many factors such as volume of piston displacement, manifold pressure, carburetor throat size, etc.

The precise portion of a particular charge to a given cylinder which is pre-formed in the manifold during the time that the intake valve to that cylinder is closed under various operating conditions is not constant. However, when one takes into consideration the relationship of the piston displacement to the manifold volume in most engines, the portion of the total charge to a given cylinder which is pre-formed in the manifold would not normally exceed about 70% of the total under normal operating and may be as small as 20% of the total. In a four-cycle engine (consider two cylinders with mid located carburetor for example) the intake valve to a given cylinder is closed about 72% of the time. Since the rate of flow of exhaust gas entering the manifold at opening 226 is essentially constant at a given engine operating condition, the size of opening 226 is selected such that 72% of the exhaust gas entering the manifold through that opening during a given engine cycle is sufficient to fill about 7–20% of the manifold that contains the pre-formed part of the charge. Experiments show that such volume of exhaust gas entering at opening 226 will result in increase of the average manifold pressure by about 2" Hg. It should, of course, be noted that during 28% of the engine cycle (intake valve open), exhaust gas entering the manifold at opening 226 somewhat dilutes that portion of the charge which was not pre-formed in the manifold.

At the completion of the intake stroke of a given cylinder when the intake valve closes, that part of the manifold which will contain the pre-formed part of the next charge will be the nominal fuel/air mixture, however during the remaining 72% of the cycle, exhaust gas entering at opening 226 and properly directed by holes 228 to create a pocket of diluted exhaust gas will compress a portion of that nominal mixture toward the intake valve and another portion toward the carburetor thereby creating a pocket of diluted exhaust gas in that part of the manifold where a portion of the charge is pre-formed.

When the intake valve 206 opens and the piston 204 performs its intake stroke, the stratified charge created with the aid of stratifying devices 222, 224 as described above, is delivered to the cylinder 202 forming (1) a nominal mixture layer adjacent the face of piston 204, (2) a middle diluted exhaust gas layer, and (3) another nominal layer adjacent the spark plug 220. During the compression stroke of the piston 204 the layered or stratified charge in the cylinder 202 essentially maintains its stratified characteristics with reduced volume.

Although the size of the opening at 226 should be varied in proportion to the amount of fuel/air mixture entering the manifold from the carburetor, experience shows that the size of the opening at 226 can be fixed. When the size of the opening at 226 is fixed, the volume of the midlayer of diluted exhaust gas in the manifold will vary with operating conditions of the engine. By properly selecting a particular size of opening at 226, the effect of the variation in volume of the mid-layer with engine operating conditions will not seriously impact stratified charge advantages in normal engine use.

In multi-cylinder engines the sequence is the same but the timing sequence alters the times involved.

Exhaust from cylinder 202, under control of exhaust valve 208, passes through exhaust port 215 to exhaust manifold 212.

As shown in the drawing, gases from exhaust 212 not only enter through opening 226 to cause midlayer stratification but also delivered through conduit portion 260 and EGR valve 262 to the manifold throat or EGR port to effect a conventional exhaust gas re-circulation system. It will be understood that this invention may be practiced with or without the use of conduit 260 and EGR valve 262. In a conventional EGR system which does not employ this invention, the EGR valve responds to the intake manifold pressure and is so adjusted as to permit the passage of an optimum amount of exhaust gas to the intake manifold throat. The optimum is usually selected as a trade-off between maximum $NO_x$ reduction and minimum gas consumption. Frequently the volume of exhaust gas entering the manifold throat is about 20% of the fuel/air mixture from the carburetor 218. When practicing this invention in an engine equipped with the conventional EGR system, the volume of exhaust gas passed by EGR valve 262 can remain the same; however, an additional amount of exhaust gas (7%-15% of carburated mixture) passes through orifice 226 to produce the diluted exhaust gas single mid-layer of charge with substantial further reduction of $NO_x$ and little or no effect on gas consumption.

To evaluate pollution control devices as related to automobiles, the Cornell vehicle-emissions-control laboratory has established a test procedure based on the Federal CVS cyle (see Appendix I of 40CRF85 published in Federal Register, Volume 37, No. 211, Nov. 15, 1972). Our test procedure follows the first twenty three minutes of the CVS cycle. Tests are conducted in both hot and cold start modes. The exhaust is continuously monitored and time histories of the pollutants are recorded. Three pollutants are monitored. These are nitric oxide, hydrocarbons, and carbon monoxide. The monitoring instruments are similar to those used at EPA-certified laboratories. They include a chemiluminescent nitric oxide detector, a flame ionization detector for hydrocarbons, and an infrared detector for carbon monoxide. Fuel consumption is measured directly, and humidity and barometric pressure readings are taken. Results obtained in these tests correlate well with results obtained at EPA-certified laboratories A first series of experiments was performed on a 1970 AMC Hornet, recently equipped with a new 1977, 232 CID 6 cylinder engine (404E 23) received from AMC corporation. The engine was equipped with a standard exhaust gas recirculation system, and a single barrel carburetor. This particular engine did not come with exhaust port air injection for hydrocarbon and carbon monoxide control.

The modiciation to the existing engine consisted of two stratification screws placed in the intake manifold on either side of the carburetor.

Copper tubing ($\frac{3}{8}$" OD-$\frac{1}{4}$" ID, 8" long in a circular pattern) was used to pipe exhaust gas to the screws 222 and 224 (each being provided with an orifice 226) and the size of the orifices 226 were 0.1339 inches. A second series of holes 228 in each of the screws 222, 224 was provided to direct exhaust toward their related intake valves; thus there was created not only a mid-layer of the charge which is exhaust gas diluted, but also exhaust gas was introduced to the nominal layer of the charge which is formed adjacent the intake valve. The EGR is piped to the screws from a spacer plate that is installed between the normal EGR valve and the engine manifolds.

As a control case, a second system was designed to put in the same extra EGR through the main EGR port.

The results of the test series, with the optimum flow rate of extra EGR, is shown in Table I.

Table I

| Run # | $NO_x$Factor | H/C | Gas Consumption | |
|---|---|---|---|---|
| 1 | 16823 | 59850 | 57 oz. | Base Car |
| 2 | 12067 | 84000 | 60 oz. | Extra EGR-uniform dist. |
| 3 | 9998 | 69375 | 55½ oz. | Extra EGR-stratified |

It should also be noted that in Run 2. the engine was very rough running during the idle period, and had poor performance in general, while in Runs 1 and 3 the performance was basically the same. The system of EGR stratification when used in addition to a base amount of EGR will significantly reduce $NO_x$ emissions while suffering a slight increase in hydrocarbons in this car.

These excess hydrocarbons can be easily reduced by external means. For example, exhaust port air injection or a catalytic converter may be used. The control case shows that the addition of extra EGR in the same configuration as the normal exhaust gas recirculation does not have the same effect as stratification.

A second series of tests as described above was conducted on a 1976 Malibu - 350 CID 8 cyclinder engine (3970010) equipped with standard EGR and a HC/CO catalyst.

Copper tubing (¼" OD-⅜" ID) was used to pipe exhaust gas from the EGR valve spacer plate through a ⅜" ID tee. From the tee to each of the screws 222, 224 exhaust gas was piped by ¼" OD-3/16" ID copper tubing. The orifice at the EGR spacer plate was 0.095 inches, holes 228 in the screws were directed across the intake manifold and none of the holes 228 were directed toward the intake valves.

The results of the second series of tests are shown in Table 2.

Table 2

| Run # | $NO_x$Factor | H/C | Gas Consumption | |
|---|---|---|---|---|
| 1 | 26136 | 7425 | 67¼ oz. | Base Car |
| 2 | 16100 | 7450 | 74¼ oz. | Extra EGR-uniform dist. |
| 3 | 10485 | 7035 | 67 oz. | Extra EGR-stratified |

Reduction of nitric oxide by exhaust gas recirculation results from the reduction in engine temperature due to the diluent effect of EGR. This decrease in temperature of combustion lengthens the time required for the formation of nitric oxide. Because of the limited time spent at high temperatures, this lengthening of the formation time results in a reduction of nitric oxide. The lowering of peak temperature can also result in a loss of power; thus, engine performance and drivability are changed. There is a limit to the amount of EGR that can be used because of this loss of power.

The stratification techniques as taught above can be applied to rotary engine applications and two cycle reciprocating engines. The flexiblity of the stratification profile of the intake manifold permits adoption of the pre-stratification techniques as described above to rotary engine configurations including the Wankel type. The basic teaching of the present application is the use of the intake manifold to create through a precharge the desired stratification profile. Such is accomplished by bringing exhaust gases within the intake manifold (associated with a closed intake valve) via one or more streams flowing over different through paths outside the flow of carbureted fuel/air mixture and such is accomplished by a pressure priority relation created for this purpose.

While in accordance with the provisions of the Patent Statutes the preferred form and embodiments of the invention have been disclosed, it will be apparent that changes may be made in the disclosed apparatus without deviating from the inventive concept disclosed herein.

What is claimed is:

1. In an internal combustion engine having a combustion chamber, a carburetor for producing a fuel/air mixture, intake manifold and intake valve means for delivering a charge of said mixture to the combustion chamber, an ignition device for igniting the charge in the combustion chamber, and exhaust valve and exhaust manifold means for removing products of combustion from the combustion chamber; the improvement comprising:
   (a) a stratifying device including a conduit containing a plurality of holes;
   (b) said intake manifold having a portion thereof wherein flow therein is determined by whether said intake valve means is open or closed;
   (c) said stratifying device being positioned in said intake manifold portion controlled in flow by said intake valve means such that the gas passes directly from said conduit through said holes in a direction transverse to the axis of flow within said intake manifold portion towards a wall of said intake manifold; and
   (d) exhaust gas passage means connected between said exhaust manifold and said conduit, whereby when said intake valve is closed, exhaust gas enters said intake manifold through the holes of said stratifying device to produce a pocket of diluted exhaust gas in the intake manifold, and when the intake valve is open, the stratified charge delivered to the combustion chamber includes a layer of diluted exhaust gas.

2. Apparatus as defined in claim 1, wherein said exhaust gas passage means includes a restriction to the flow of exhaust gas of such dimensions that the rate of flow through the passage is about 7%-20% of the rate of flow of fuel/air mixture through said carburetor.

3. In the method of operating an internal combustion engine the improvement which comprises:
   creating a column of air/fuel mixture in an intake manifold portion which functions as part of the charge of a cylinder of an internal combustion engine by closing the intake valve of said cylinder, and
   creating at least one pocket of diluted exhaust gas in said column of air/fuel mixture by injecting the exhaust gas, transverse to the axis of flow of said column.

* * * * *